United States Patent [19]

Rammler et al.

[11] 4,268,359
[45] May 19, 1981

[54] METHOD FOR COOLING DUSTLIKE OR FINE-GRAINED SOLIDS

[75] Inventors: Roland Rammler, Königstein; Ingo Dreher, Oberursel; Rainer Rudisch, Bruchköbel, all of Fed. Rep. of Germany

[73] Assignee: Metallgesellschaft Aktiengesellschaft, Frankfurt am Main, Fed. Rep. of Germany

[21] Appl. No.: 7,441

[22] Filed: Jan. 29, 1979

[30] Foreign Application Priority Data

Feb. 8, 1978 [DE] Fed. Rep. of Germany ....... 2805244

[51] Int. Cl.³ .................... C10B 49/10; C10B 39/00
[52] U.S. Cl. ...................... 201/31; 34/20; 48/210; 201/35; 201/36; 201/39; 422/139; 422/146
[58] Field of Search .......... 201/31, 35, 36, 39; 202/99, 108, 121, 228; 48/197 R, 210; 208/8 R; 34/13, 20, 65; 422/139, 146, 208, 295

[56] References Cited

U.S. PATENT DOCUMENTS

| | | | |
|---|---|---|---|
| 1,826,209 | 10/1931 | Godel | 202/121 |
| 2,683,657 | 7/1954 | Garbo | 422/146 X |
| 2,832,725 | 4/1958 | Scott, Jr. | 201/4 |
| 3,141,834 | 7/1964 | Allred | 208/8 R |
| 3,484,364 | 12/1969 | Heminger | 201/31 X |
| 3,619,405 | 11/1971 | Smith | 201/36 X |
| 3,692,506 | 9/1972 | Johnson | 48/210 |
| 3,705,086 | 12/1972 | Schmalfeld et al. | 201/36 X |
| 3,736,247 | 5/1973 | Jones, Jr. et al. | 208/11 R |
| 3,960,700 | 6/1976 | Rosen et al. | 208/8 R |
| 4,094,767 | 6/1978 | Gifford | 201/31 X |

FOREIGN PATENT DOCUMENTS 1085495 7/1960 Fed. Rep. of Germany ...... 202/228

*Primary Examiner*—Frank W. Lutter
*Assistant Examiner*—Roger F. Phillips
*Attorney, Agent, or Firm*—Sprung, Felfe, Horn, Lynch & Kramer

[57] ABSTRACT

A method and apparatus for cooling dustlike or fine-grained reaction residue emanating from a reactor is disclosed. According to the method reaction residue emanating from a reactor passes downwardly into a cooling shaft where it is maintained in the form of a pile of bulk material under a gas pressure of 20 to 200 bars while cooling gas passes upwardly through said cooling shaft in counter-current and is removed at the top of said cooling shaft into the reactor. The apparatus comprises means for effecting cooling of such reactor residue.

11 Claims, 2 Drawing Figures

METHOD FOR COOLING DUSTLIKE OR FINE-GRAINED SOLIDS

This invention relates to a method of cooling hot, dustlike or fine-grained reaction residue coming from a reactor, and to apparatus for carrying out the method.

British Patent Specification No. 787,292 discloses a multi-stage fluidized-bed system in which fine-grained solids are contacted with heated gases, which flow through the fluidized beds from bottom to top. The solids flow through immersion conduits from the uppermost fluidized bed zone into lower ones. The lowermost zone is the hottest. A similar concept is described in U.S. Pat. No. 2,832,725.

U.S. Pat. No. 3,705,086 describes a process for the dry distillation of fine-grained coal. Coal trickling from top to bottom over intermediate plates is contacted with hot gases flowing in a countercurrent. In a zone disposed below the dry-distillation zone, the resulting fine coke is cooled by gases flowing also in a countercurrent. Neither the dry-distillation zone nor the cooling zone consists of a fluidized bed. These known processes are carried out under an approximately atmospheric pressure. It is also known in the art to cool various kinds of reactor residues indirectly under various operating conditions at cooling surfaces formed by tubes, cooling boxes or the like.

The object underlying the method according to the invention is to cool hot reaction residue from a reactor in a cooling zone in a simple and economical manner. This object is accomplished in that the reaction residue in the form of a pile of bulk material is caused to flow downwardly in at least one cooling shaft under a gas pressure of 20 to 200 bars and is flown through by a countercurrent of cooling gas, which is conducted from the cooling shaft into the reactor. The cooling shaft is preferably disposed below the reaction zone. A plurality of cooling shafts connected in parallel may be provided, e.g., when a single shaft would be too large.

In the treatment of lump materials, it is conventional to contact the solids and a cooling gas flowing in countercurrents. On the other hand, when applied to fine-grained to dustlike material that operation gives rise to difficulties because such materials may be fluidized or even entrained by gases flowing even at relatively low velocity. As a result, the desirable thermal effect of the countercurrent contact is eliminated even when the cooling gas flows at such a low rate that an adequate cooling effect is not produced unless the cooling shaft is very large in cross-section. But this is not tolerable from operational and cost aspects.

The velocity at which a gas stream can fluidize a granular material is almost independent of the gas pressure. For this reason the gas rate which can be achieved at velocities below the fluidizing velocity rises with the gas pressure. Because in the method according to the invention the cooling zone is under high pressure, the velocity of flow of the cooling gas can be selected below the fluidizing velocity and the heat transfer conditions can be properly selected too. The arrangement of the reactor residue in the cooling shaft as a fixed or travelling bed enables a heat exchange between the hot reaction residue and the cooling gas flowing in a countercurrent. This enables a strong cooling of the solids and high temperatures of the cooling gas at the exit from the cooling zone. If the reaction residue were fluidized, the intense mixing in the bed would cause the cooling gas and the solids to be approximately at the same temperature when leaving the cooling zone.

The cooling of the reactor residue by a direct heat exchange with the cooling gas, in accordance with the invention, results in much higher heat transfer rates than the known indirect cooling.

Compared to the cooling of lump material, the direct cooling of fine-grained to dustlike material in the method according to the invention results in a much higher heat transfer rate because the fine material presents a much larger area for heat transfer. This area may be larger by orders of magnitude, depending on the particle size.

Although it is not necessary from the aspect of technology, it is important for the economy of the method that the cooling gas is conducted from the cooling shaft into the reactor and participates in the reactions taking place in the reactor. About 10 to 40% of all gas fed to the reactor come preferably as heated gas from the cooling shaft. As a result, the energy balance of the system is greatly improved.

The reaction residue which is cooled in the cooling shaft suitably has only particle sizes below 10 mm, preferably below 5 mm. A person skilled in the art may prefer to cool such fine-grained material in a fluidized bed or in a plurality of fluidized beds connected in series. This is intentionally avoided in the method according to the invention.

The reactors which precede the cooling shaft are either fluidized-bed reactors or entraining gas stream reactors provided with the required separators for collecting the reaction residue. The invention will be explained more fully hereinafter with reference to fluidized-bed reactors.

The reaction residue coming from a fluidized-bed reactor is at a temperature between about 400° to 1200° C. as it enters the cooling shaft. In many cases the reaction residue flows to the cooling shaft through a transfer conduit in contact with a countercurrent of heated cooling gas rising from the cooling shaft into the reactor. The free area of the transfer conduit is so selected that the reaction residue is in a fluidized state in said conduit. This transfer conduit provides for a structurally simple connection between the fluidized-bed reactor and the cooling shaft. Alternatively, the heated cooling gas may be withdrawn from the cooling shaft and supplied to the fluizided-bed reactor through one or more separate conduits.

The fluidized-bed reactor normally has a gas inflow bottom or grate provided with through openings through which the reaction residue can pass. The through openings may be replaced by one or more overflow conduits between the fluidized-bed space and the cooling shaft. A simple structure will be obtained if the fluidized-bed reactor has no grate so that the reaction residue can enter the cooling shaft from the fluidized bed. The travelling bed provided according to the invention in the cooling shaft then constitutes a support for the fluidized bed in the reactor.

It is important that the cooling gas enters the lower portion of the cooling shaft in a uniform distribution. This will ensure a maximum heat transfer between the hot solids and the cooling gas. Internal fixtures, such as hoods, rooflike elements or louverlike obstructions, may be provided in the cooling shaft to promote the uniform flow of gas through the pile of solids, to prevent a channeling of the gas and to ensure that the solids travel through the cooling zone at an approximately uniform velocity.

Large cooling shafts may suitably be provided with a withdrawing device, which extends throughout the cross-section and uniformly withdraws the cooled reaction residue and feeds it to a discharge device provided underneath. Such withdrawing means may consist, e.g., of a group of discharge rollers. Alternatively, a grate, known per se, may be provided with movable displacing pushers. Such grate may also constitute a distributor for the cold cooling gas. In that case the gas may simply be fed into the empty chamber below the withdrawing means so that there is no need for separate gas-distributing means.

By use of an adjustable withdrawing means in the cooling shaft, the rate at which cooled reaction residue is withdrawn from the cooling shaft may be varied to control the height of the fluidized bed in the reactor.

The method according to the invention may be adapted to treat various kinds of solids with various kinds of cooling gases. In a suitable use, dustlike or fine-grained coal is partly reacted in the fluidized bed with a gaseous fluid, the resulting gasification residue (residual coke) is fed into the cooling shaft, and part of the gaseous fluid is heated in the cooling shaft while flowing in a countercurrent to the residual coke and is then fed to the fluidized bed. In the hydrogenating gasification of coal in the fluidized bed, hydrogen is used to cool the residual coke and is then available as a gasifying agent in the fluidized bed.

BRIEF DESCRIPTION OF DRAWINGS

Preferred further features of the invention will now be explained with reference to the drawings, in which FIG 1. is a longitudinal sectional view showing a fluidized-bed reactor combined with a cooling shaft

DESCRIPTION OF SPECIFIC EMBODIMENTS

Figure 1:
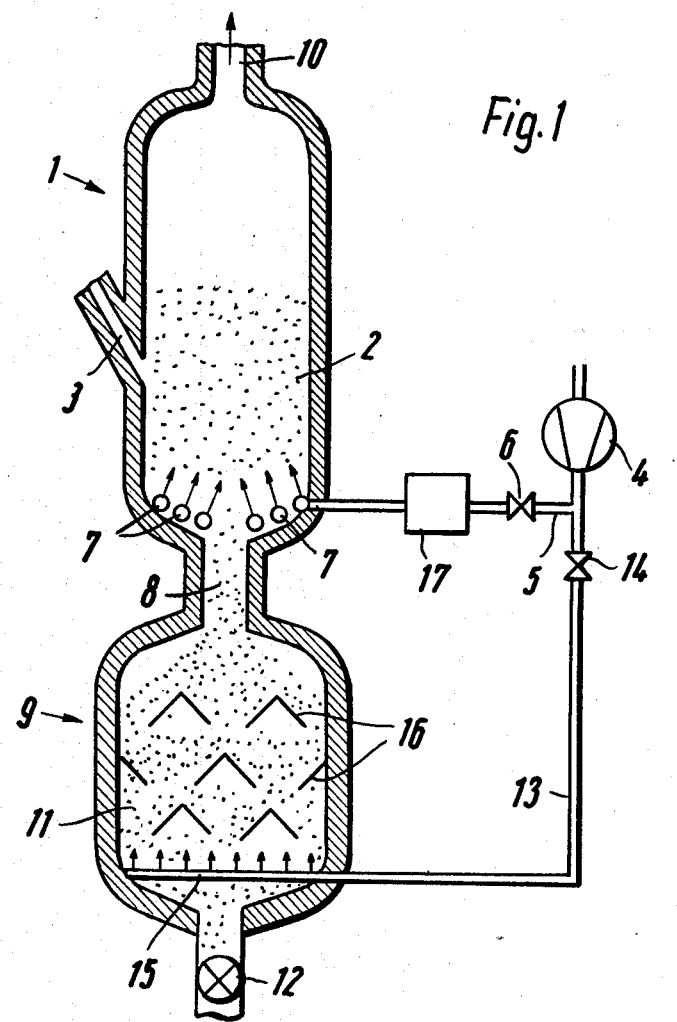

A fluidized-bed reactor 1 shown in FIG. 1 contains a fluidized bed 2 consisting of dustlike or finegrained solids, which are fed through conduit 3 by means not shown. The gases for producing and maintaining a fluidized state are compressed by a compressor 4 and fed to a gas heater 17 through conduit 5, which incorporates a control valve 6. The heated gas flows into the distributing system 7 of the reactor and then into the fluidized bed 2. The distributing system shown on the drawing consists of a plurality of concentric or parallel conduits. Alternatively, a grate system comprising longitudinal and transverse tubes or, e.g., a nozzle grate having through openings for the passage of the solids may be used.

In the fluidized-bed reactor 1 shown in the drawing, the conventional gas-distributing grate under the fluidized bed has been omitted. Owing to this design, a certain part of the reaction residue is constantly transferred from the reactor 1 through a transfer duct 8 into the cooling shaft 9 disposed underneath. A pressure of about 20 to 200 bars is maintained in the reactor 1 and the cooling shaft 9. Gaseous and vaporous reaction products leave the reactor 1 through conduit 10 and are preferably supplied to means (not shown) which serve to collect dust, to cool and scrub the gas, and/or to condense vaporous reaction products. The reactor 1 and the cooling shaft 9 have a pressure-resistant shell, which is provided with a refractory lining.

The cooling shaft 9 contains the reaction residue in the form of a bulk material pile 11, which is to be considered as a fixed bed. Part of the cooled reaction residue is continuously transferred by a discharge device 12, e.g., a star wheel device, to lock chambers, which are not shown. As a result, the pile 11 of bulk material gradually descends in the cooling shaft 9 and is supplemented by reaction residue at a corresponding rate from the fluidized bed 2. The height of the fluidized bed 2 is thus controlled by the operation of the device 12 and by the rate at which fresh material is fed at 3.

Cooling gas is fed to the cooling shaft 9 from the compressor 4 through a branch conduit 13, which incorporates a control valve 14. The gas exits from the gas distributor 15 and rises in a countercurrent to the moving pile 11. The cooling gas receives heat from the reaction residue and then flows through the transfer conduit 8 into the fluidized bed 2. When leaving the cooling shaft 9, the cooled reaction residue is at temperatures which are at least 100° lower and normally 300° to 900° C. lower than the reaction temperature in the fluidized bed 2. The substantial utilization of the sensible heat of the reaction residue in the method is an important contribution to a good heat economy.

The cooling shaft 9 contains internal fixtures 16, which in the drawing are shown as roof-shaped elements. These internal fixtures such as in the shape of an inverted funnel promote a uniform descent of the bulk material in the shaft 9 and prevent a channeling of gas through the pile 11. Such channeling would decrease the dissipation of heat. The roof-shaped internal fixtures 16 may be replaced by different internal fixtures, such as hoods, funnels or louverlike obstructions.

Although care should be taken in the method according to the invenion to prevent the formation of a fluidized bed in the cooling shaft 9, the dustlike or fine-grained material may be locally agitated to some degree adjacent to the openings through which the cooling gas exits from the gas distributor 15 or adjacent to constrictions of the area of flow. Such agitation will be so slight that it does not alter the fixed-bed condition of the bulk material 11.

Figure 2:
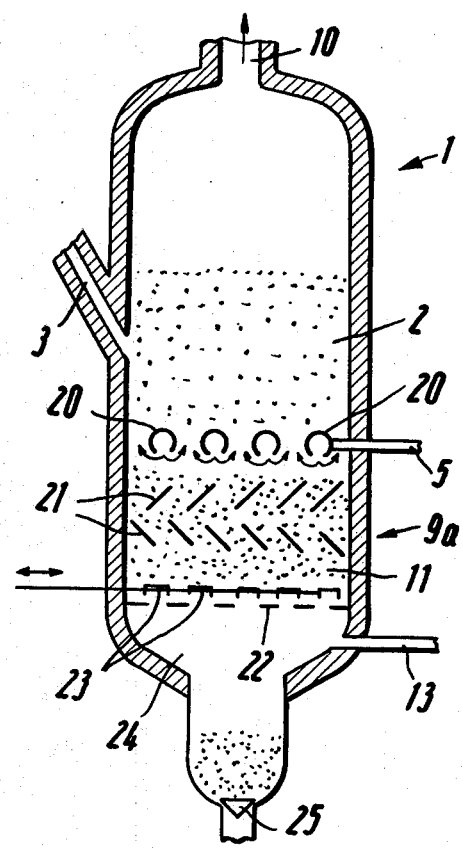
FIG. 2 shows a modification of FIG. 1.

In the arrangement shown in FIG. 2, the fluidizing gas enters the fluidized bed 2 from parallel conduits 20, which have outlet openings that are downwardly directed so that they cannot not be clogged during standstill times. It will be understood that the same measure may be employed in the distributing system 7 shown in FIG. 1.

The cooling shaft 9a is disposed closely below the conduits 20 and provided with louverlike internal fixtures 21. The pile 11 of bulk material consisting of reaction residue from the fluidized bed 2 is supported by a grate 22. Discharge pushers 23 are disposed over the grate and can be jointly operated from the outside to reciprocate in a horizontal direction. The motion of the pushers will control the rate at which cooled reaction residue falls down through the grate.

Just as in FIG. 1, cooling gas is fed through conduit 13 and is conducted first into an empty chamber 24 in the lower portion of the cooling shaft 9a and then uniformly enters the pile 11 through the grate 22, which serves as a distributor. The solids are collected below the grate 22 and periodically discharged through the cone valve 25, which is the upper portion of a lock chamber, the other parts of which are not shown.

The systems shown in the drawing may be used, e.g., to subject coal, preferably brown coal or non-caking, reactive bit coal, in the fluidized bed 2 to hydrogenating gasification mainly to produce methane. For this purpose hydrogen is fed to the fluidized bed 2 and also to the pile 11 of residual coke to cool the latter. During the hydrogenating gasification of coal, temperatures of 700° to 1100° C. are preferred in the fluidized bed 2 and the cooled residual coke is at temperatures of 50° to 400° C. when leaving the cooling shaft. If the temperature of the fluidized bed is decreased down to about 400° C., the reaction will gradually change from a hydrogenating gasification to a hydrogenating dry distillation, which serves mainly to produce liquid fuel from coal and results in much higher yields of hydrocarbons, particularly high-grade low-boiling hydrocarbons, than the conventional dry distillation.

The invention will now be explained more in detail by two examples.

EXAMPLE 1

In a system as shown in FIG. 1, the fluidized-bed reactor 1 is fed at a rate of 9 metric tons per hour with predried brown coal, which has a water content of 3% and a particle size range of 0 to 1 mm. At 100 bars and 900° C., the brown coal is subjected in the fluidized bed 2 to hydrogenating gasification in contact with preheated hydrogen. About 80% of the hydrogen which is required are preheated to 550° C. and supplied to the reactor through the distributor 7. At a rate of 2500 kg/h, the gasification residue is continuously fed to the cylindrical cooling shaft 9, which is disposed under the reactor 1. The gasification residue has also a particle size of 0 to 1 mm. It is cooled by hydrogen, which is introduced through the gas distributor 15 at a rate of 2700 standard m$^3$/h. By a countercurrent heat exchange with the residual coke in the cooling shaft the hydrogen is heated from 60° C. to about 890° C. This hydrogen stream constitutes the remaining 20% of the gasifying agent supplied to the fluidized bed 2.

To ensure that the velocity of flow of the gas remains below the velocity at which the residual coke would be fluidized, the cooling shaft 9 has an inside diameter of 1.6 meters. In the upper portion of the cooling shaft 9, the velocity of an unobstructed flow of hydrogen is 0.016 m/s. The overlying fluidized bed is 1.0 meter in diameter.

The hydrogen heated in the cooling shaft flows upwardly into the gasification reactor through the distributor 7 for the preheated hydrogen and is mixed with the latter in and above the plane of the distributor 7. The temperature of the mixed hydrogen streams is about 620° C. The gasification reactions between the hydrogen and the brown coal consist mainly of exothermic methanating reactions and result in the fluidized bed in the above-mentioned temperature of 900° C. The product gases and unreacted gasifying agent are jointly withdrawn through conduit 10 and subjected to the required aftertreatment, particularly to cooling and purification.

EXAMPLE 2

In a system as shown in FIG. 2, brown coal which has a particle size of 0 to 3 mm and has been preheated to 250° C. is supplied at a rate of 300 metric tons per hour to a fluidized-bed reactor having an inside diameter of 3 meters and is subjected therein to hydrogenating dry distillation at a pressure of 50 bars and a temperature of 530° C. in contact with high-hydrogen hydrogenating gas, which has been preheated before being supplied to the fluidized bed 2. About 75% of the hydrogenating gas are heated to 850° C. and fed to the reactor in conduit 5.

The residue from dry distillation has a particle size of 0 to 3 mm and is fed at a rate of 150 metric tons per hour into the cooling shaft 9a and is cooled therein by hydrogenating gas fed through conduit 13 at a rate of 105,000 standard m$^3$/h. In the bulk material pile 11 the hydrogenating gas is heated from 60° to 520° C. The heated cooling gas constitutes the remaining 25% of the hydrogenating gas.

The cooling shaft 9a is 3 meters in inside diameter so that the maximum velocity of an unobstructed flow of the gas amounting to 0.24 meter/second, is lower than the velocity at which the residue from dry distillation would be fluidized. The residue from dry distillation is cooled to about 300° C. and is pushed by the displacing pushers 23 to fall intermittently through the grate 22 into the lower portion of the cooling shaft 9a and is withdrawn from there in batches. After having been withdrawn through a lock chamber, the residue from dry distillation may be gasified in a gas producer or burnt in a boiler furnace or put to another use.

The cooling gas from conduit 13 flows through the pile 11 and is thus heated to about 520° C. The mixed hydrogenating gases entering the fluidized bed 2 are at a temperature of about 770° C. and subject the coal to hydrogenating dry distillation, which results in a temperature of about 530° C. in the fluidized bed. High-hydrogen fluidizing gas which has been enriched with gases produced by dry distillation and with tar vapors, leaves the reactor 1 through conduit 10 and is supplied to succeeding equipment in which dust is collected and tar, oil, gasoline and aqueous condensate are subsequently condensed.

What is claimed is:

1. A method of cooling hot, dustlike or fine-grained reaction residue having a particle size below 5 mm and emanating from a reactor which method comprises passing said reaction residue in the form of a pile of bulk material downwardly through at least one cooling shaft, maintaining a pressure in said reactor and said cooling shaft of 20 to 200 bars, passing upwardly through said cooling shaft in counter-current flow to said reaction residue a cooling gas and conducting said cooling gas into said reactor, the velocity of said counter-current flow of gas being insufficient to fluidize said residue in said cooling shaft.

2. A method according to claim 1 wherein the reaction residue emanating from the reactor is distributed among a plurality of cooling shafts connected in parallel.

3. A method according to claim 1 wherein the reactor is a fluidized bed reactor.

4. A method according to claim 1 wherein the reactor is an entraining gas stream reactor provided with a separator for collecting the reaction residue.

5. A method according to claim 1 wherein the reaction residue emanating from said reactor is at a temperature in the range of about 400° to 1200° C.

6. A method according to claim 1 wherein the reactor is a fluidized bed reactor wherein there is maintained a bed of fluidized reaction solids and reaction residue is withdrawn from the cooling shaft at a rate to maintain the height of the fluidized bed in the reactor.

7. A method according to claim 1 wherein 10 to 40% of the entire gas that is fed to the reactor comes from the cooling shaft.

8. A method according to claim 1 wherein the cooling gas is fed in a substantially uniform distribution into the lower portion of the pile while the same is disposed in the cooling shaft.

9. A method according to claim 1 wherein the cooling gas is fed into a free space in the lower portion of the cooling shaft and from such point is distributed into the pile of reaction residue.

10. A method according to claim 1 wherein coal is partially reacted with a gaseous fluid in said reactor, the resulting residual coke is passed downwardly from said reactor into said cooling shaft and a portion of the gaseous fluid fed to the reactor comprises heated cooling gas from the cooling shaft.

11. A method according to claim 10 wherein hydrogen is employed to cool the residual coke in said cooling shaft and said hydrogen thereafter passes upwardly into said reactor.

* * * * *